United States Patent
Beddus et al.

(10) Patent No.: US 7,142,510 B1
(45) Date of Patent: Nov. 28, 2006

(54) COMMUNICATIONS NETWORK

(75) Inventors: Simon A Beddus, Ipswich (GB); Gary L Bruce, Woodbridge (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/530,785

(22) PCT Filed: Nov. 24, 1998

(86) PCT No.: PCT/GB98/03501

§ 371 (c)(1),
(2), (4) Date: May 5, 2000

(87) PCT Pub. No.: WO99/29135

PCT Pub. Date: Jun. 10, 1999

(30) Foreign Application Priority Data

Dec. 4, 1997 (EP) .................................. 97309810
Mar. 30, 1998 (EP) .................................. 98302452

(51) Int. Cl.
*H04J 1/16* (2006.01)
*H04J 3/14* (2006.01)

(52) U.S. Cl. .................. 370/230.1; 370/231; 370/352; 370/395.2; 370/401; 370/466; 370/522; 379/93.31; 379/220.01

(58) Field of Classification Search ........ 370/230–234, 370/395.2, 465–466, 296, 464, 467, 397, 370/352, 353, 422, 401, 522; 709/228; 379/93.31, 379/93.32, 93.34, 219, 220.01
See application file for complete search history.

(56) References Cited

U.S. PATENT DOCUMENTS

| | | | | |
|---|---|---|---|---|
| 4,984,264 A | * | 1/1991 | Katsube | 379/197 |
| 5,561,666 A | * | 10/1996 | Christensen et al. | 370/276 |
| 6,072,773 A | * | 6/2000 | Fichou et al. | 370/230 |
| 6,085,238 A | * | 7/2000 | Yuasa et al. | 709/223 |
| 6,125,123 A | * | 9/2000 | Furuno | 370/467 |
| 6,181,691 B1 | * | 1/2001 | Markgraf et al. | 370/352 |

FOREIGN PATENT DOCUMENTS

JP    EP 0606079    *    7/1994

OTHER PUBLICATIONS

Mikelaitis "A Tutorial on ISDN Customer Call Control 1", The Telecommunications Joyrnal of Australia, vol. 38, No. 1, 1988, pp. 75-92, XP002075878.*

Mikelaitis, "A Tutorial on ISDN Customer Call Control. I", The Telecommunications Journal of Australia, vol. 38, No. 1, 1988, pp. 75-92, XP002075878.

Veeraraghavan, "Connection Control In ATM Networks", Bell Labs Technical Journal, vol. 2, No. 1, Sep. 21, 1997, pp. 48-64, XP000659568.

Kelly, "Service Validation and Testing", Feature Interactions in Telecommunications Systems III, Papers Presented at the Third Feture Interactions Workshop (FIW '9) Kyoto, Oct. 11-13, 1995, No. Workshop 3, Oct. 11, 1995, pp. 173-184, XP000593332.

* cited by examiner

*Primary Examiner*—John Pezzlo
*Assistant Examiner*—Inder Pal Mehra
(74) *Attorney, Agent, or Firm*—Nixon & Vanderhye, P.C.

(57) ABSTRACT

In a communications network, communications terminals exchange call control capability data which mutually identifies selected call control protocols and network address types. The terminals subsequently set up a call using protocols chosen from those identified. The terminals may continuously monitor for a request for the exchange of such data, allowing other parties to join a session subsequently, after the initial set up.

13 Claims, 9 Drawing Sheets

COMMUNICATIONS NETWORK

BACKGROUND TO THE INVENTION

1. Field of the Invention

The present invention relates to a communications system, and in particular to a heterogeneous system employing a number of different call control mechanisms and different address types.

2. Description of Related Art

In a conventional, homogeneous, communications network, such as the public switched telephony network (PSTN), customers have only one type of address (in this case their telephone number) and there is a single uniform call control mechanism which is built into the network. The call control mechanism is used for establishing and for terminating calls and for recognising, e.g., when a called party is busy. Increasingly, however, customers have access to a range of different network technologies, each with its own address type. For example, a customer might have in addition to a telephone number a conventional IP (Internet protocol) address, a multicast IP address and a URL (uniform resource locator). In general, each of these different address types has associated with it a respective call control protocol (where the term "call control" is used broadly to denote the means for establishing and terminating connections between different parties). For example, audio or visual communication between parties using conventional IP addresses commonly uses the H.323 protocol, whereas for communication between broadband ATM addresses a different protocol, B-ISDN (broadband-integrated services digital network), is used. In practice, the call control protocol which is used for a particular communication session tends to be determined by the party who initiates the session. If other parties later join a session, they are then restricted to using the addressing and call control capabilities determined by the initiating party.

SUMMARY OF THE INVENTION

According to a first aspect of the present invention there is provided a method of operating a communications systems comprising:

(a) exchanging between communication terminals call control capability data, which call control capability data identifies for each respective terminal a selected one or more of a plurality of different call control protocols and different network addresses and;

(b) setting up a call between the said communications terminals using call control protocols or network addresses identified in the said call control capability data.

The present invention makes it possible to use fully the capabilities of terminals in a heterogeneous communications system by providing for peer terminals to exchange data which identifies their call control and address types. This approach allows the full potential of a heterogeneous communications system to be realised, since the use of this mechanism makes it unnecessary for users to adopt the "lowest common denominator" in addressing and call control types. This serves to encourage the use of advanced call control and addressing mechanisms offering greater flexibility, even if initially those advanced call control and addressing mechanisms are used only by a minority of terminals in the communications system.

Preferably the step of exchanging call control capability data is carried out prior to initiating call set-up.

The exchange of data might be integrated with the call set-up process, forming the initial part of that process. However, for maximum flexibility, it is preferred that the exchange is carried out independently prior to call set-up. The user might then choose not to proceed with set-up depending upon the capabilities of the or each other terminal.

Preferably a first terminal initiates the exchange of call control capability data by transmitting the call control capability data for the first terminal to a second terminal and the second terminal returns an acknowledgement to the request, which acknowledgement includes call control capability data for the second terminal.

It is found to be particularly effective to implement the exchange of data interactively, using a simple request/response.

Preferably the method includes monitoring continuously at a communications terminal a communications port and carrying out the exchange of call control capability data whenever a request is received at the said port. Preferably the said step of monitoring continues after a call has been set up.

The preferred implementation further enhances the flexibility of the communications system, by allowing the exchange of capability data to be carried out at any time. This makes it possible for the system to respond, for example, to the arrival of a new member with new communication capabilities in a multi-party communications session, or to respond to a change in the capabilities of one of the parties in an on-going session.

According to a second aspect of the present invention, there is provided a communications terminal including:

(a) means for exchanging call control capability data with other communications terminals, which call control capability data identifies for respective terminal a selected one or more of a plurality of different call control protocols and different network addresses; and (b) means for setting up a call between the said communications terminal and the other communications terminal using a call control protocol or network address type identified in the call control capability data received from the said other communications terminal.

BRIEF DESCRIPTION OF THE DRAWINGS

The invention also encompasses a communications system including communications terminal in accordance with the second aspect of the invention.

Methods and systems embodying the present invention will now be described in further detail, by way of example only, with reference to the accompanying drawings, in which.

DETAILED DESCRIPTION OF EXEMPLARY EMBODIMENTS OF THE INVENTION

Figure 1:
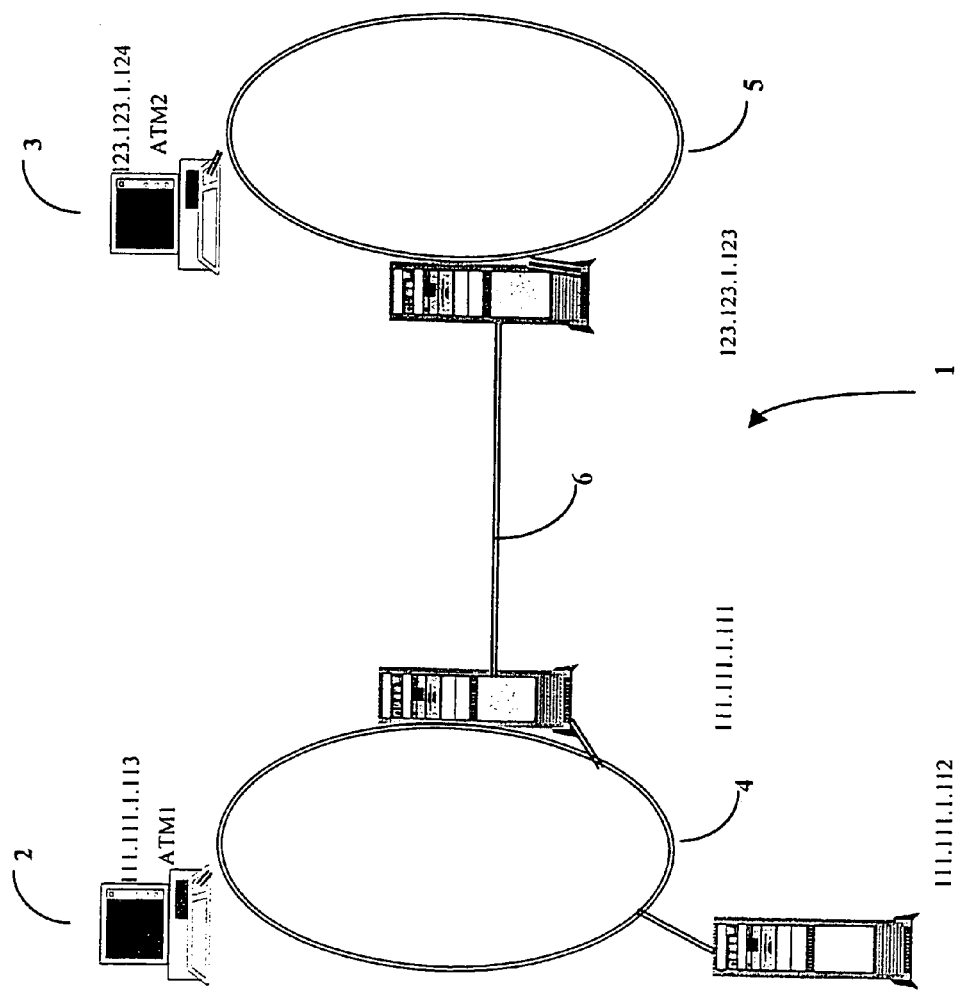
FIGS. 1 is a schematic of a first network embodying the present invention.

A communications system 1 includes user terminals 2, 3 connected to different respective network domains 4, 5. In this example, the user terminals 2, 3 are computer workstations. The network domains in this example are broadband networks which support both ATM (asynchronous transfer modes) and IP (Internet protocol) transmission protocols. The user terminal has both a user address (111.111.1.113) and an ATM address (ATM1). Similarly, the second user terminal has an Internet address (123.123.1.124) and an ATM address (ATM2). The network domains are linked by a connection 6 which also supports both of these protocols. Each of the terminals 2, 3 stores a respective client capability object which records the address types and call control types which the terminal is capable of handling. The client objects in the different terminals communicate with each other using a predetermined communication protocol (in the present example Internet protocol). The exchange of address and call control capabilities between two clients is carried out independently of the call or calls in progress between a session.

Figure 2:
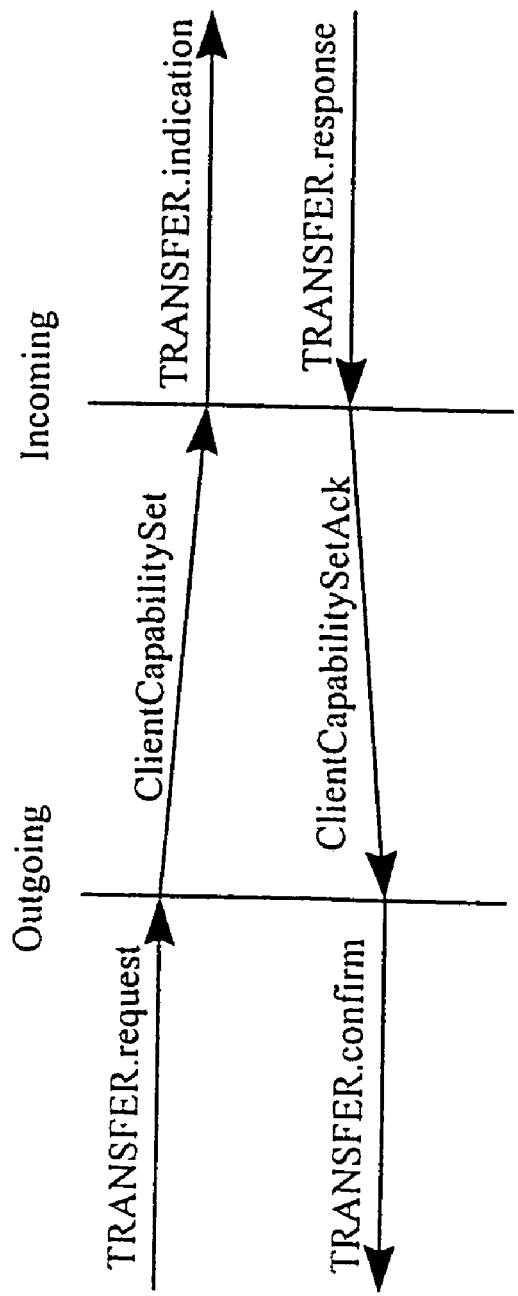
FIG. 2 illustrates the exchange of capability data.

As illustrated in FIG. 2, the exchange mechanism is initiated when a TRANSFER.request primitive is issued by the user of the outgoing client. The TRANSFER.request from the initiating client includes the client capabilities set for the corresponding terminal. This client capability set indicates all the call control technologies and addresses supported by the terminal. The user of the incoming client is notified of the request for the exchange of client capability data by a TRANSFER. indication primitive. The user of the incoming client then initiates transfer of its capabilities using the TRANSFER.response primitive. The capabilities of the incoming terminal, that is the terminal which receives the incoming client capability exchange request, are sent back to the originating terminal using a client capability set acknowledge message. The user of the originating client is notified that the exchange of capability data has taken place by a TRANSFER. confirm primitive.

The client capability set data in the message as described above identify which of a number of predetermined address types and call control types are supported. Examples of different address types which might be supported include e-mail, URL (uniform resource locator), IP multicase, IP unicast, E.164, AESA. Examples of different call control types include H.225.0, SDP, B-ISDN Q.2971, B-ISDN ATM-F UNI, N-ISDN Q.931, PSTN BTNR 315.

Table 1 below contains a complete listing of the address and call control types supported by one implementation of the invention. As indicated in the table, different integer codes are used to identify the different respective call control and address types.

TABLE 1

| Class | Data |
| --- | --- |
| Client | familiarName : String |
| | distinguishedName : String |
| | domainName : String |
| | password : String |
| | clientCapabilities : List |
| ClientCapability | |
| Address | addressType : Integer = 0 |
| IP | addressType : Integer = 1 |
| | version : String |

TABLE 1-continued

| Class | Data |
| --- | --- |
| Multicast | addressType : Integer = 2 |
| | version : String |
| | timeToLive : Integer |
| Unicast | addressType : Integer = 3 |
| | version : String |
| E164 | addressType : Integer = 4 |
| | version : String |
| AESA | addressType : Integer = 5 |
| | version : String |
| | type : String |
| E-mail | AddressType : Integer = 7 |
| URL | AddressType : Integer = 7 |
| | SummaryText : String |
| CallControl | callControlType : Integer = 0 |
| | version : String |
| H225 | callControlType : Integer = 1 |
| | version : String |
| SDP | callControlType : Integer = 2 |
| | version : String |
| BISDN | callControlType : Integer = 3 |
| | version : String |
| ATM-FUNI3.1 | callControlType : Integer = 4 |
| | version : String |
| Q2931 | callControlType : Integer = 5 |
| | version : String |
| Q2971 | callControlType : Integer = 6 |
| | version : String |
| NISDN | callControlType : Integer = 7 |
| | version : String |
| Q931 | callControlType : Integer = 8 |
| | version : String |
| PSTN | callControlType : Integer = 9 |
| | version : String |
| BTNR315 | callControlType : Integer = 10 |
| | version : String |
| SMTP | callControlType : Integer = 11 |
| HTTP | callControlType : Integer = 12 |

As indicated in the above table, the capabilities notified through the capability exchange mechanism may include a URL (uniform resource locator). The URL may be accessed by the terminal which initiated the capability set transfer in order to read details of further capabilities beyond those provided for in the table above. In this way the capability exchange protocol is made extensible to encompass new call protocols. The URL may also direct the terminal to resources, such as a Java applet, which may be downloaded by the terminal to facilitate its communication with the terminal which provided the URL. For example, the URL might relate to an HTTP page which includes a Java applet which displays a "call me" button. Then when the button is clicked on, a call is made from the terminal owning the URL to the other terminal.

Figure 3B:
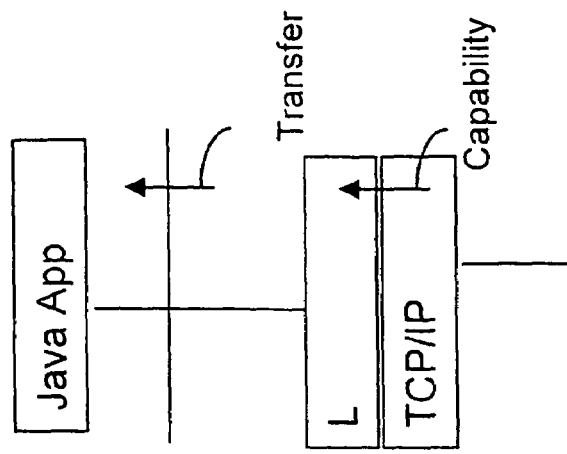
FIGS. 3a and 3b illustrate protocol stacks for systems embodying the invention.
Figure 3A:
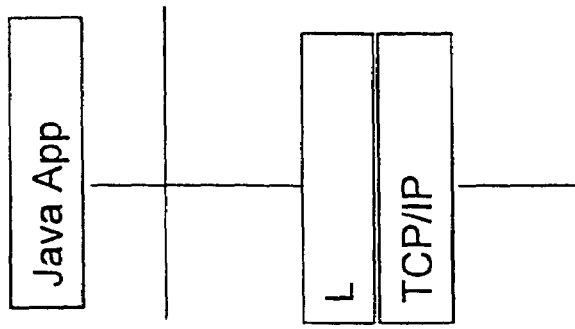
Figure 3A:
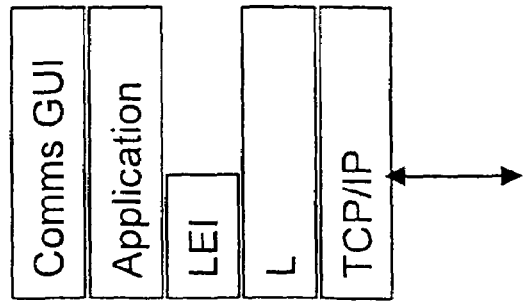

FIGS. 3a and 3b illustrate the software architecture of a system embodying the invention. Each communications terminal runs a communications programme comprising a communications graphics user interface (GUI 31) on top of a communications application 32. The communications application 32 is supported by a number of resources 33 including a capability exchange module (CE) below this, a "listener module" continually monitors a predetermined socket defined by the IP address of the communications terminal together with a 16-bit port number. The CE and listener modules may coexist with other resources such as the session invitation protocol (SIP) and H323 modules shown in FIG. 3a. Capability set messages are passed between the UDP/TCP/IP layer and a capability exchange (CE) module. The listener module communicates transfer primitives to/from the CE module. In this preferred implementation, UDP (unreliable datagram protocol) is used rather than TCP (transport control protocol) for transporting the capability set data across the network. This avoids the overheads involved in setting up a TCP data stream. However this approach then requires that packets should be re-transmitted if not acknowledged after a predetermined period, to allow for the possibility of packet loss. FIG. 3b shows message flows across different API's (application programmer's interfaces) as capability data is exchanged between two terminals. The transfer primitives shown in FIG. 2 correspond to the API between the application layer (implemented using the Java language in this example) and the lower layers of the protocol stack.

Figure 4A:
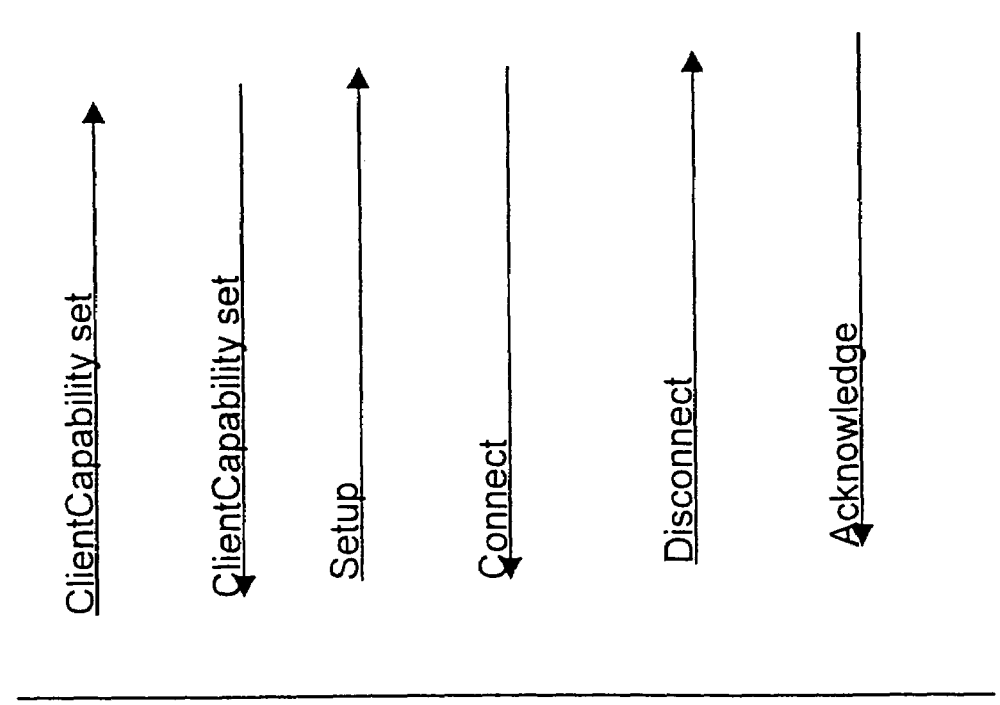
FIGS. 4a and 4b show message flow sequences in systems embodying the invention.
Figure 4B:
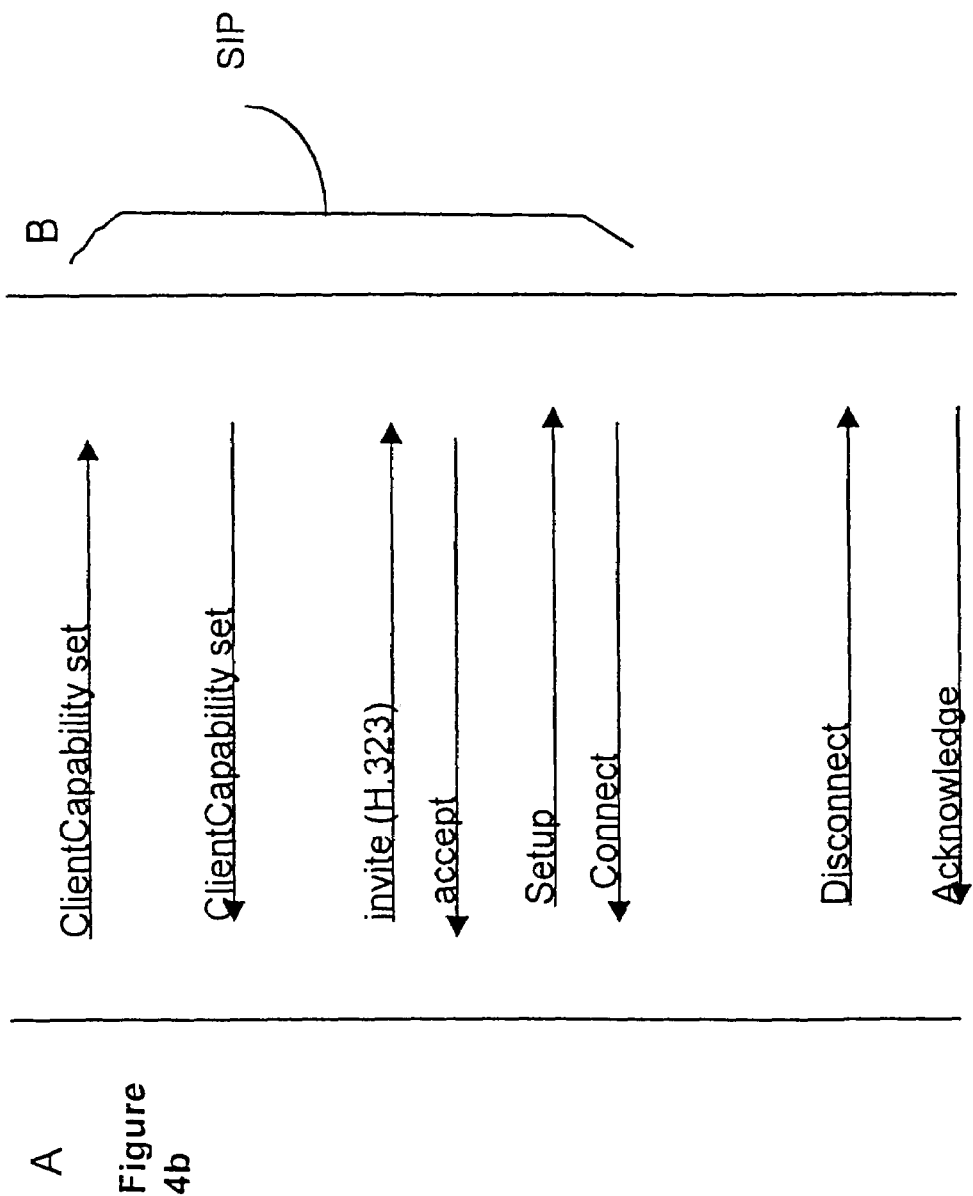

FIGS. 4a and 4b show in further detail the sequence of message flows between terminals A and B in different implementations of the invention. In the sequence of FIG. 4a, the exchange of capability data takes place prior to a session being established. Immediately after the exchange of capabiltiy data, a call is set-up using, e.g., the sequence of messages defined for an ISDN protocol such as H.320, in the case where the capability data indicated that both parties had this call control capability. In the second example, illustrated in FIG. 4b, following the exchange of capability data, and prior to a call being set-up using, e.g., the H.323 call control protocol, Session Invitation Protocol (SIP) to establish the session.

Figure 5:
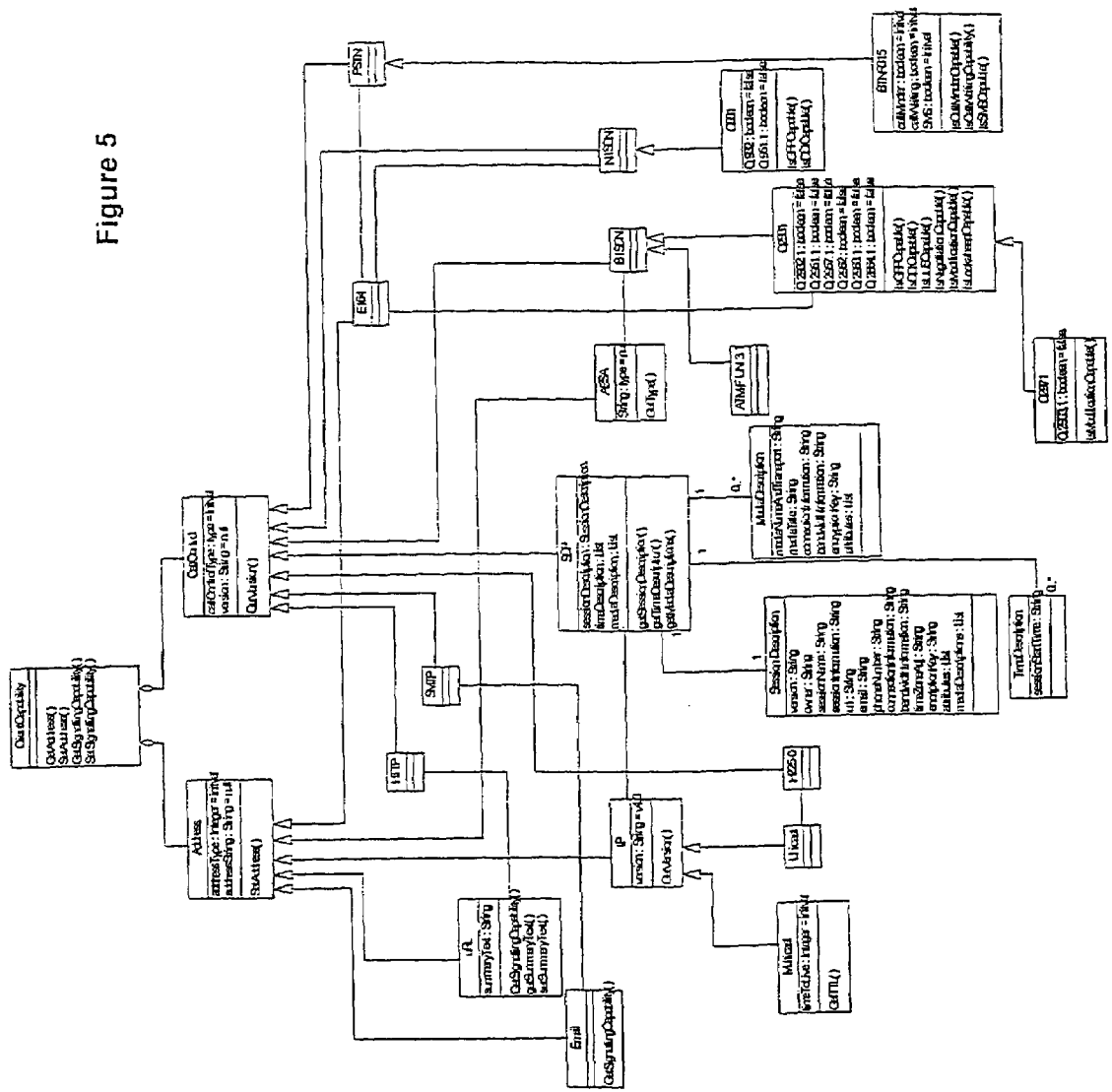
FIGS. 5 and 6 are diagrams showing software objects implementing the invention.
Figure 6:
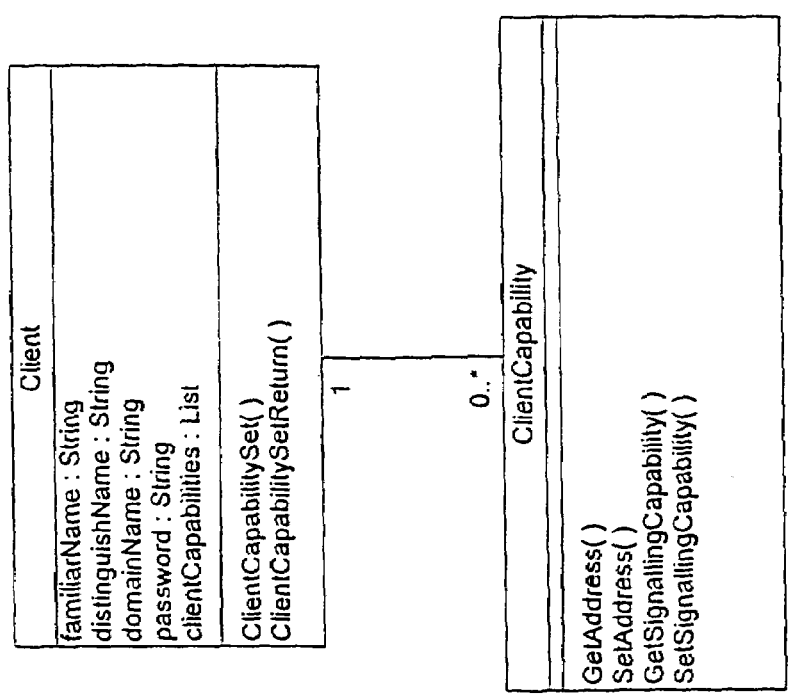

FIGS. 5 and 6 are diagrams using the Rational ROSE (Rational Object-oriented Software Engineering) formalism to define software objects for implementing the embodiments discussed above. The structure shown may be compiled using the ROSE software tool which is available commercially from Rational Software Corp. of Santa Clara, Calif. to generate, e.g., C++ code to form the basis of an implementation of the invention. As shown in FIG. 6, a client object which as instantiated on each terminal includes clientcapabilityset and clientcapabilityreturn methods, which methods are inherited by a client capability object. The properties of the client capability object are in turn inherited by address and call control objects as shown in FIG. 5.

Figure 7:
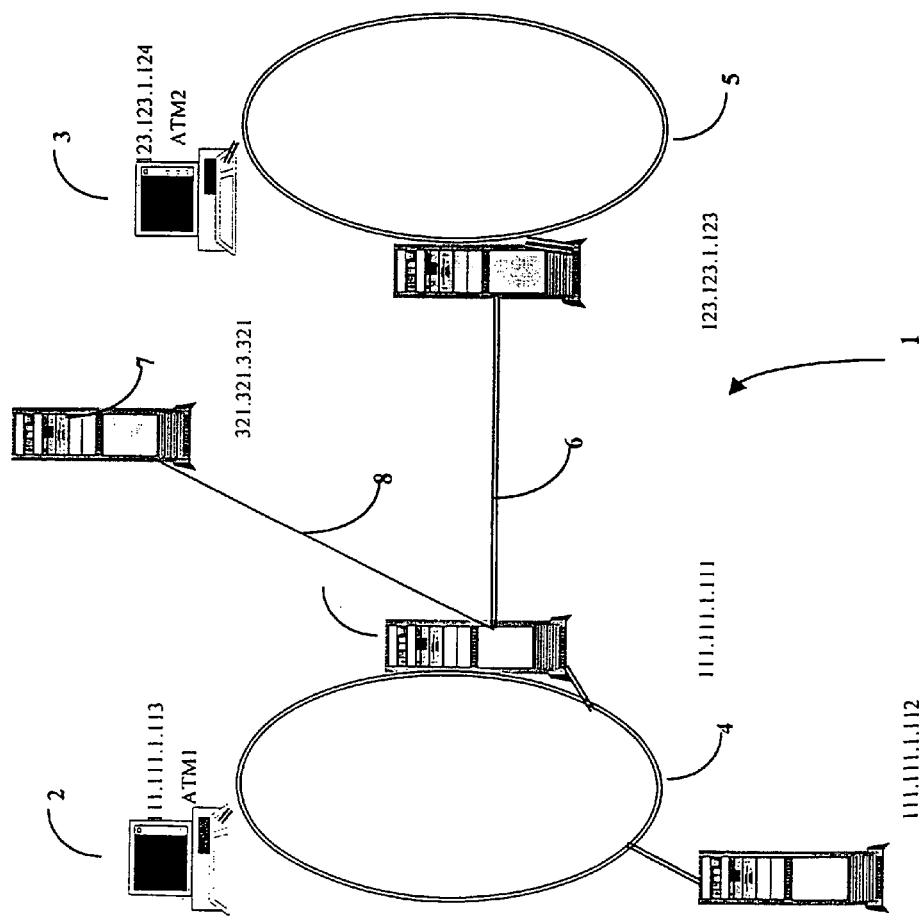
FIG. 7 illustrates a second embodiment.

As an alternative to the direct transfer of client capability data, this may be effected via a directory. This method is described in the co-pending European application 97309810.6 filed 4 Dec. 1997 (agent's reference A25527) the contents of which are incorporated herein by reference. FIG. 7 illustrates an embodiment in which the exchange of data is mediated by a directory platform 7. The directory platform 7 is connected to the network by a link 8 which transports IP data between the network and the directory platform 7. The other components of the network are as previously described with respect to FIG. 1.

In use, customers at user terminals 2,3 both register with a directory server which, in this example, runs on the directory platform 7. Subsequently, as will be further described below, when a customer at user terminal 2 wishes to contact the customer registered at user terminal 3, then a request is submitted to the directory server. This request is transmitted to the IP address of the directory platform 7. The request includes data, such as the customer name, which identifies the called customer. The directory server uses this data to select a corresponding user profile which was created when the customer registered with the directory server. From the selected user profile the directory server returns to the calling customer the network addresses and call control capabilities of the called customer. Using this information the calling customer sets up a call to the other customer. For example, the calling customer in this instance may choose to establish a connection to the ATM address (ATM2) using the ATM call control protocol (Q.2931).

Figure 8:
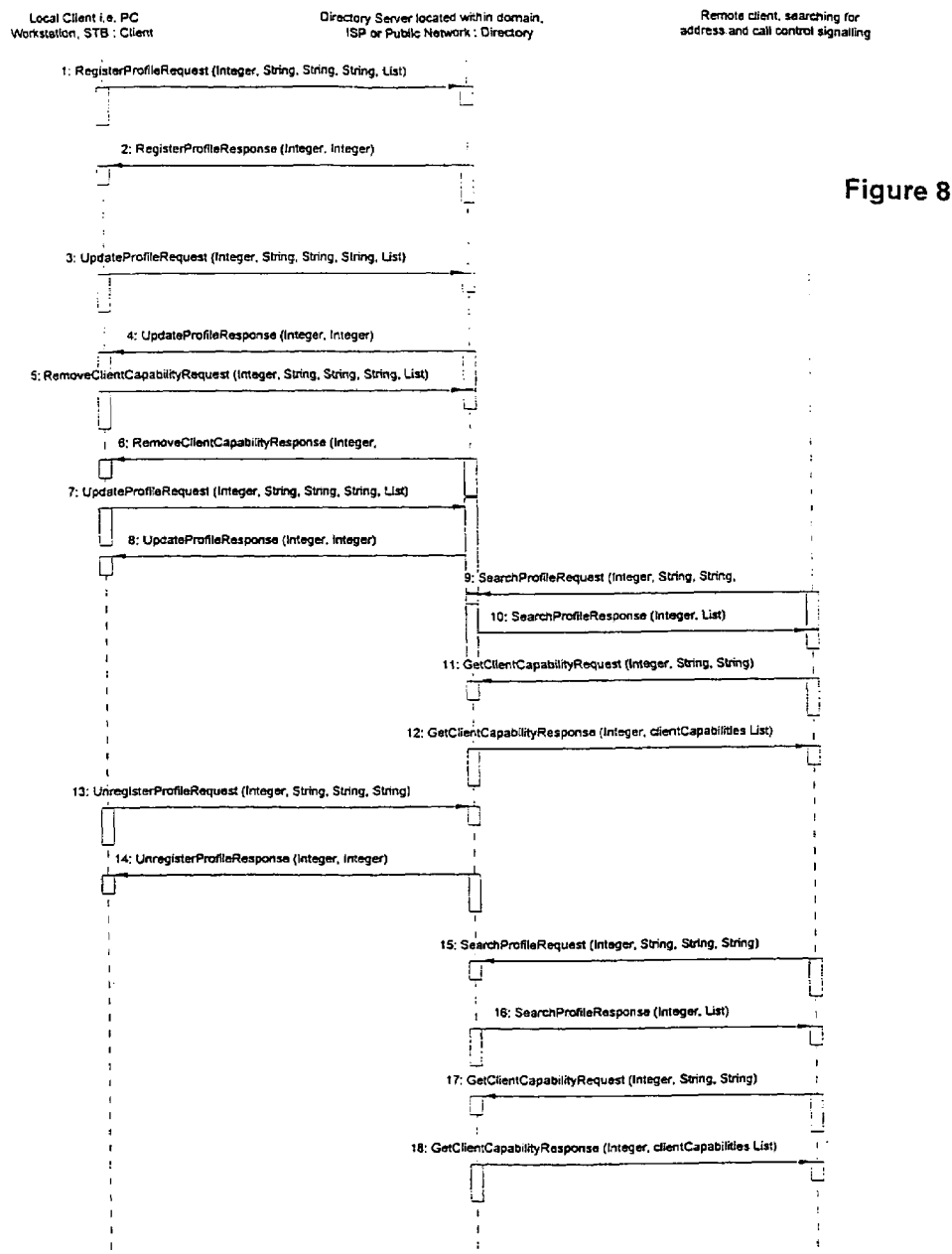
FIG. 8 shows message flows in the networks of FIG. 7.

FIG. 8 shows the message flows between a local client, the directory platform (or "server") 7 and a remote client in this embodiment, as the local client registers its call control capability with the directory, and the remote client subsequently reads the call control capability data.

The invention claimed is:

1. A method of operating a communications system comprising:
   (a) exchanging between communication terminals call control capability data, which call control capability data identifies for each respective terminal a plurality of different call control protocols and different network addresses; and
   (b) setting up a call between the communications terminals using a call control protocol and network address selected from the plurality of different call control protocols and network addresses identified in the call control capability data;
   wherein the exchanging of the call control capability data is carried out prior to initiating call set-up.

2. The method according to claim 1,
   wherein a first one of the communications terminals initiates the exchange of call control capability data by transmitting the call control capability data for the first one of the communications terminals to a second one of the communications terminals and the second one of the communications terminals returns an acknowledgement to the transmitted call control capability data, which acknowledgement includes call control capability data for the second one of the communications terminals.

3. The method according to 1, further including monitoring continuously at a communications terminal a communications port and carrying out the exchange of call control capability data whenever a request is received at the communications port.

4. The method according to claim 3, wherein the monitoring of the communications port continues after a call has been set up.

5. The method according to claim 1, further including communicating as part of the call control capability data a pointer to a source of further data identifying capabilities not provided for directly in the call control protocols.

6. The method according to claim 5, wherein the pointer is a uniform resource locator (URL).

7. A communications terminal comprising:
   (a) means for exchanging call control capability data with at least another communications terminal, which call control capability data identifies for a respective terminal plurality of different call control protocols and different network addresses; and
   (b) means for setting up a call between the communications terminal and the other communications terminal using a call control protocol and network address type selected from the plurality of different call control protocols and different network addresses identified in the call control capability data received from the other communications terminal, the setting up of the call by the means for setting up being initiated after the exchange of call control capability data is performed by the means for exchanging call control capability data.

8. A communications network comprising a plurality of communication terminals, in which different ones of the plurality of communications terminals support different respective call control protocols, and in which each of the communications terminals includes:
- (a) means for exchanging call control capability data with at least another communications terminal, which call control capability data identifies for a respective terminal a plurality of different call control protocols and different network addresses; and
- (b) means for setting up a call between the communications terminal and the other communications terminal using a call control protocol and network address type selected from the plurality of different call control protocols and different network addresses identified in the call control capability data received from the other communications terminal, the setting up of the call by the means for setting up being initiated after the exchange of call control capability data is performed by the means for exchanging call control capability data.

9. A communications terminal comprising:
- (a) means for exchanging call control capability data with at least another communications terminal, which call control capability data identifies for a respective terminal a plurality of different call control protocols and different network addresses; and
- (b) means for setting up a call between the communications terminal and the other communications terminal using a call control protocol and network address type selected from the plurality of different call control protocols and different network addresses identified in the call control capability data received from the other communications terminal;

wherein the means for exchanging exchanges the call control capability data prior to when the means for setting initiates setting up the call between the communications terminal and the other communications terminal.

10. A communications network comprising a plurality of communication terminals, in which different ones of the plurality of communications terminals support different respective call control protocols, and in which each of the communications terminals includes:
- (a) means for exchanging call control capability data with at least another communications terminal, which call control capability data identifies for a respective terminal a plurality of different call control protocols and different network addresses; and
- (b) means for setting up a call between the communications terminal and the other communications terminal using a call control protocol and network address type selected from the plurality of different call control protocols and different network addresses identified in the call control capability data received from the other communications terminal;

wherein the means for exchanging exchanges the call control capability data prior to when the means for setting initiates setting up the call between the communications terminal and the other communications terminal.

11. A method of operating a communications system comprising:
- (a) receiving at a first communications terminal call control capability data from at least another communications terminal, which call control capability data identifies for the at least another communications terminal a plurality of different call control protocols and different network addresses; and
- (b) setting up a call between the first and the at least another communications terminal using a call control protocol and network address selected from the plurality of different call control protocols and different network addresses identified in the call control capability data;

wherein the receiving of call control capability data is performed prior to initiating call set-up.

12. A communications terminal comprising:
- (a) means for receiving call control capability data from at least another communications terminal, which call control capability data identifies for the at least another communications terminal a plurality of different call control protocols and different network addresses; and
- (b) means for setting up a call between the communications terminal and the at least another communications terminal using a call control protocol and network address type selected from the plurality of different call control protocols and different network addresses identified in the call control capability data received from the at least another communications terminal, the setting up of the call by the means for setting up being initiated after the call control capability data is received by the means for receiving.

13. A communications network comprising a plurality of communication terminals, in which different ones of the plurality of communications terminals support different respective call control protocols, and in which each of the communications terminals includes:
- (a) means for receiving call control capability data from at least another communications terminal, which call control capability data identifies for the at least another communications terminal a plurality of different call control protocols and different network addresses; and
- (b) means for setting up a call between the communications terminal and the at least another communications terminal using a call control protocol and network address type selected from the plurality of different call control protocols and different network addresses identified in the call control capability data received from the at least another communications terminal, the setting up of the call by the means for setting up being initiated after the call control capability data is received by the means for receiving.

* * * * *